US009009605B2

(12) United States Patent
Guilbert

(10) Patent No.: US 9,009,605 B2
(45) Date of Patent: Apr. 14, 2015

(54) TEMPORAL CONTROL OF A VIRTUAL ENVIRONMENT

(75) Inventor: Oskar Guilbert, Paris (FR)

(73) Assignee: DON'T NOD Entertainment, Paris (FR)

( * ) Notice: Subject to any disclaimer, the term of this patent is extended or adjusted under 35 U.S.C. 154(b) by 1003 days.

(21) Appl. No.: 13/069,117

(22) Filed: Mar. 22, 2011

(65) Prior Publication Data
US 2012/0246583 A1 Sep. 27, 2012

(51) Int. Cl.
G06F 3/048 (2013.01)
A63F 13/20 (2014.01)
A63F 13/40 (2014.01)
G06F 3/01 (2006.01)

(52) U.S. Cl.
CPC ............... *A63F 13/06* (2013.01); *A63F 13/10* (2013.01); *A63F 2300/6045* (2013.01); *A63F 2300/634* (2013.01)

(58) Field of Classification Search
CPC ............ A63F 13/12; A63F 2300/5553; G06F 3/04815; G06F 3/011; H04L 29/06034
USPC .......................................... 715/719, 720, 757
See application file for complete search history.

(56) References Cited

U.S. PATENT DOCUMENTS

| 6,699,127 | B1 | 3/2004 | Lobb et al. ...................... 463/43 |
| 6,815,600 | B2 | 11/2004 | Georges et al. ................ 84/609 |
| 8,632,409 | B2* | 1/2014 | Wolfson et al. ................ 463/42 |
| 2003/0076301 | A1 | 4/2003 | Tsuk et al. .................... 345/159 |
| 2003/0131715 | A1 | 7/2003 | Georges ........................ 84/609 |
| 2007/0094585 | A1* | 4/2007 | Ando et al. ................ 715/500.1 |
| 2007/0136679 | A1* | 6/2007 | Yang .............................. 715/772 |
| 2009/0063983 | A1* | 3/2009 | Amidon et al. ............... 715/733 |
| 2009/0066647 | A1 | 3/2009 | Kerr et al. ..................... 345/158 |
| 2009/0083665 | A1* | 3/2009 | Anttila et al. ................. 715/834 |
| 2009/0158203 | A1 | 6/2009 | Kerr et al. ..................... 715/784 |
| 2009/0165000 | A1* | 6/2009 | Gyorfi et al. .................. 718/102 |

(Continued)

FOREIGN PATENT DOCUMENTS

EP 0 844 580 A2 5/1998
EP 1 752 865 A2 2/2007

(Continued)

OTHER PUBLICATIONS

Pitchingace99, "Lets Play—Prince of Persia: sands of Time [3]—The Hourglass", May 27, 2010. Video sequence at 9:30-9:50. PDF doc. "prince.of.persia.gameplay5.27.10.pdf".*

*Primary Examiner* — Nicholas Augustine
(74) *Attorney, Agent, or Firm* — Pillsbury Winthrop Shaw Pittman LLP

(57) ABSTRACT

Temporal control of a virtual environment may be provided. Content may be provided for presentation to a user. The content may be provided in a forward sequence. The content may include views of the virtual environment. A signal may be received from a user input device responsive to a manipulation of the user input device by the user. The signal may include manipulation information related to the manipulation of the user input device by the user. A determination may be made as to whether the manipulation of the user input device satisfies a condition based on the manipulation information. The content may be provided for presentation to the user in a reverse sequence starting with the most recently provided content responsive to a determination that the manipulation of the user input device satisfies the condition.

16 Claims, 3 Drawing Sheets

(56) References Cited

U.S. PATENT DOCUMENTS

2009/0201248 A1    8/2009   Negulescu et al. ............ 345/157
2010/0318204 A1*   12/2010   Daisy .............................. 700/94
2011/0107220 A1*    5/2011   Perlman ......................... 715/720
2011/0191674 A1*    8/2011   Rawley et al. ................. 715/702

FOREIGN PATENT DOCUMENTS

EP         2 070 570 A1    6/2009
WO    WO 2012/127327    9/2012

* cited by examiner

TEMPORAL CONTROL OF A VIRTUAL ENVIRONMENT

FIELD OF THE DISCLOSURE

This disclosure relates to temporal control of a virtual environment based on a manipulation of a user input device by a user.

BACKGROUND

Conventional rewinding and forwarding capabilities in virtual environments may be inconvenient to access and/or unintuitive. According to some existing technologies, for example, a user must navigate a complex on-screen menu to access and utilize rewinding and forwarding capabilities.

SUMMARY

One aspect of this disclosure relates to a system configured to provide temporal control of a virtual environment, in accordance with one or more implementations. More specifically, the system may provide highly accessible and intuitive rewinding and forwarding capabilities in virtual environments to a user. According to one implementation, content of a virtual environment that has been presented may be "rewound" responsive to an analog stick of a game controller being rotated in a counterclockwise manner. The presentation rate of the rewound content may be associated with the rotation rate of the analog stick. The system may include a computing platform, one or more user interfaces, external resources, and/or other components.

The computing platform may include information processing capabilities configured, for example, to provide a virtual environment for presentation to a user. Such processing capabilities, as well as virtual environments, are described further herein.

The user interface(s) may be configured to provide an interface between the system and a user through which the user may provide information to and receive information from the system. This enables data, results, and/or instructions and any other communicable items, collectively referred to as "information," to be communicated between the user and the system.

In some implementations, the user interface(s) may include a game controller. The game controller may include one or more components that can be manipulated by a user to facilitate interaction with a virtual environment, such as, for example, one or more analog sticks (may be referred to as a thumb stick or control stick). Generally speaking, an analog stick may include a stick protruding from the game controller. The analog stick may include a grip pad on the protruding end of the stick to facilitate manipulation of the analog stick by a user's thumb. Input may be based on the position of the analog stick in relation to a default "center" position.

The external resources may include sources of information, hosts and/or providers of virtual environments outside of the system, external entities participating with the system, and/or other resources. In some implementations, some or all of the functionality attributed herein to the external resources may be provided by resources included in the system.

Components of the system, the computing platform, the user interface(s), and/or the external resources may be operatively linked via one or more electronic communication links. For example, such electronic communication links may be established, at least in part, via a network, which may include the Internet and/or other networks. It will be appreciated that this is not intended to be limiting, and that the scope of this disclosure includes implementations in which the computing platform, the user interface(s), and/or the external resources are operatively linked via some other communication media.

The computing platform may include electronic storage, one or more processors, and/or other components. The electronic storage may comprise electronic storage media that electronically stores information. The electronic storage media of the electronic storage may include one or both of system storage that is provided integrally (i.e., substantially non-removable) with the computing platform and/or removable storage that is removably connectable to computing platform. The electronic storage may store software algorithms, information determined by the processor(s), information received from user interface(s), information received from the external resources, and/or other information that enables the system to function as described herein.

The processor(s) may be configured to provide information processing capabilities in the computing platform. As such, the processor(s) may include one or more of a digital processor, an analog processor, a digital circuit designed to process information, an analog circuit designed to process information, a state machine, and/or other mechanisms for electronically processing information. The processor(s) may be configured to execute one or more computer program modules. The one or more computer program modules may include one or more of a virtual environment module, a content tracking module, a communications module, an analysis module, and/or other modules.

The virtual environment module may be configured to provide content associated with a virtual environment for presentation to a user. The content may include views of the virtual environment. The content may be provided to one or more of the user interface(s) for presentation to the user. The content may be provided, for example, at a normal presentation rate, an accelerated presentation rate, a slowed presentation rate, and/or other presentation rates. The accelerated presentation rate may be faster than the normal presentation rate, whereas the slowed presentation rate may be slower than the normal presentation rate. The content may be provided in a forward sequence or a reverse sequence. As used herein, a "virtual environment" may include a virtual space and/or other virtual environments.

A virtual space may include a simulated space (e.g., a physical space) instanced on a computing platform which formats a view of the virtual space for display to a user. In some implementations, a virtual space may comprise a simulated space instanced on a server (e.g., the external resources) that is accessible by a client (e.g., the computing platform) located remotely from the server to format a view of the virtual space for display to a user. A virtual space may be associated with a video game.

Within a virtual space provided by the computing platform, avatars associated with the users may be controlled by the users to interact with each other. As used herein, the term "avatar" may refer to an object (or group of objects) present in the virtual space that represents an individual user. The avatar may be controlled by the user with which it is associated. The avatars may interact with each other by physical interaction within the instanced virtual space, through text chat, through voice chat, and/or through other interactions. The avatar associated with a given user may be created and/or customized by the given user.

The content tracking module may be configured to store or record content information related to the content provided to the user via the virtual environment module. The content information may include the actual content provided to the user, or the content information may be indicative of the content provided to the user. The content information may be indicative of the sequence in which the content was provided to the user. The content information may be stored or recorded in the electronic storage and/or other electronic storage media. In some implementations, the virtual environment module may be configured to provide content for presentation to the user in the reverse sequence based on stored or recorded content information.

The communications module may be configured to facilitate transfer of signals and/or information between the computing platform and user interface(s). For example, the communications module may be configured to receive one or more signals from a user input device (e.g., the user interface(s) and/or the game controller) responsive to a manipulation of the user input device by the user. The signal(s) may include manipulation information related to the manipulation of the user input device by the user. The manipulation information may include, for example, an indication of a component of the user input device (e.g., face buttons, directional pad, and/or analog stick) that was manipulated by the user, a degree of manipulation (e.g., the analog stick being shifted half of the entire range of motion from the default center position), a direction of manipulation (e.g., the analog stick being shifted to the left of the default center position), and/or other information related to the manipulation of the user input device by the user.

The analysis module may be configured to determine whether a first manipulation of a user input device (e.g., the user interface(s) and/or the game controller) satisfies a first condition based on manipulation information included in the signal(s) received by the communications module. Specific examples of conditions such as the first condition are described further herein. The virtual environment module may be configured to provide the content for presentation to the user in a reverse sequence starting with the most recently provided content responsive to a determination that the first manipulation of the user input device satisfies the first condition.

The analysis module may be configured to determine whether the first manipulation of the user input device breaches a first threshold based on the manipulation information included in the signal(s) received by the communications module. This determination may be performed responsive to the determination that the manipulation of the user input device satisfies the first condition. Specific examples of thresholds such as the first threshold are described further herein. The virtual environment module may be configured to provide the content for presentation to the user in the reverse sequence starting with the most recently provided content at a presentation rate that is different that the normal presentation rate responsive to a determination that the first manipulation of the user input device breaches the first threshold.

The analysis module may be configured to determine whether a second manipulation of the user input device satisfies a second condition based on the second manipulation information included in the signal(s) received by the communications module. Specific examples of conditions such as the second condition are described further herein. The virtual environment module may be configured to provide the content for presentation to the user in the forward sequence starting with the most recently provided content responsive to a determination that the second manipulation of the user input device satisfies the second condition. In some implementations, the content provided for presentation to the user in the forward sequence starting with the most recently provided content responsive to the determination that the second manipulation of the user input device satisfies the second condition may be limited to content the has been previously provided to the user.

The analysis module may be configured to determine whether the second manipulation of the user input device breaches a second threshold based on the second manipulation information included in the signal(s) received by the communications module. This determination may be performed responsive to the determination that the second manipulation of the user input device satisfies the second condition. Specific examples of thresholds such as the second threshold are described further herein. The virtual environment module may be configured to provide the content for presentation to the user in the forward sequence starting with the most recently provided content at a presentation rate that is different that the normal presentation rate responsive to a determination that the second manipulation of the user input device breaches the second threshold.

In implementations where the user input device includes an analog stick, the analysis module may determine one or more aspects of a manipulation of the analog stick. Examples of such aspects may include current angle, angular change, angular velocity, time dilation, and/or other aspects of a manipulation of the analog stick.

In implementations where the user input device includes an analog stick, conditions such as the first condition and the second condition may relate to the nature of a manipulation of the analog stick. For example, a condition may include that the analog stick may manipulated in a circular movement. Such a condition may further include that the circular movement be in a clockwise or counterclockwise direction. Thresholds such as the first threshold and the second threshold may relate to an angular velocity or rotation rate of the analog stick. Such a threshold may be referred to as a rotation rate threshold. The virtual environment module may be configured to provide the content for presentation to the user at a presentation rate that is different from the normal presentation rate responsive to a determination that the rotation rate of the circular movement of the analog stick breaches the rotation rate threshold.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
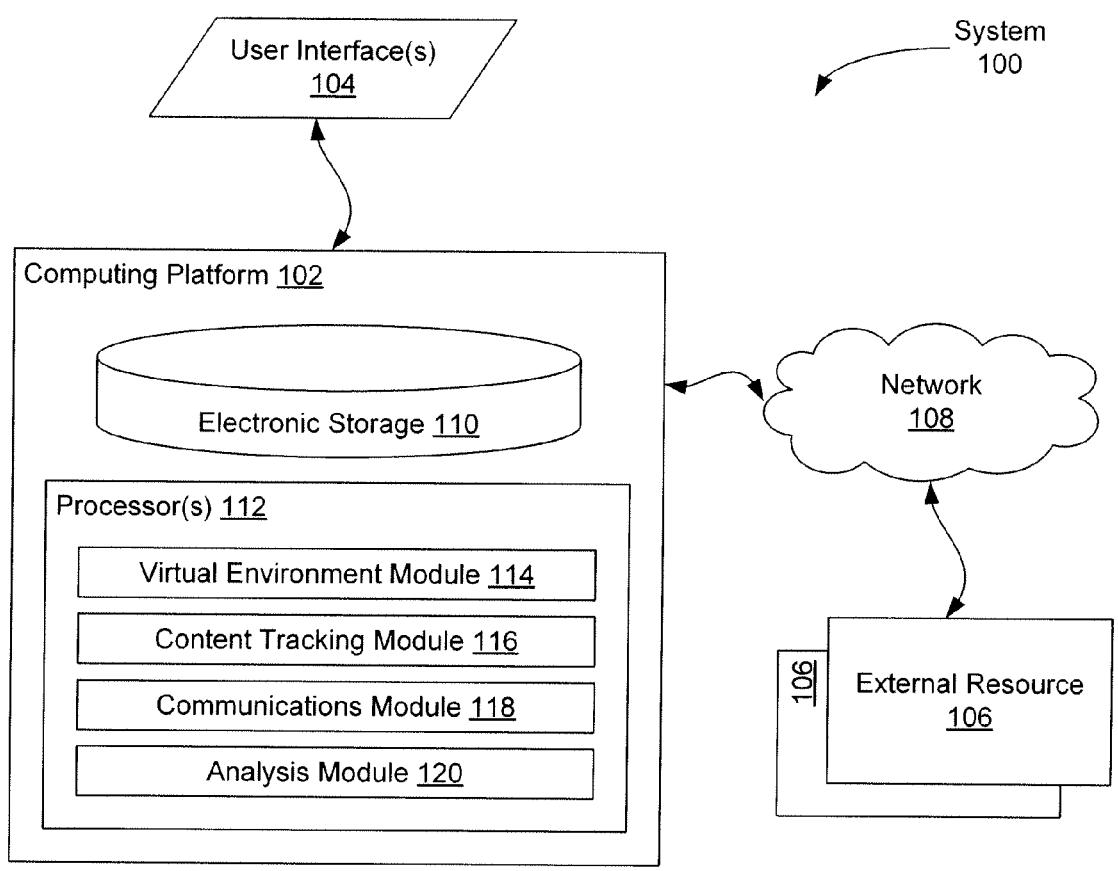
FIG. 1 illustrates a system configured to provide temporal control of a virtual environment, in accordance with one or more implementations.

FIG. 1 illustrates a system 100 configured to provide temporal control of a virtual environment, in accordance with one or more implementations. More specifically, the system 100 may provide highly accessible and intuitive rewinding and forwarding capabilities in virtual environments to a user. According to one implementation, content of a virtual environment that has been presented may be "rewound" responsive to an analog stick of a game controller being rotated in a counterclockwise manner. The presentation rate of the rewound content may be associated with the rotation rate of the analog stick. As depicted in FIG. 1, the system 100 may include a computing platform 102, one or more user interfaces 104, external resources 106, and/or other components.

The computing platform 102 may include information processing capabilities configured, for example, to provide a virtual environment for presentation to a user. Such processing capabilities, as well as virtual environments, are described further herein. By way of non-limiting example, the computing platform 102 may include one or more of a gaming console (e.g., Sony PlayStation®, Microsoft Xbox®, Nintendo Wii®, and/or other gaming consoles), a desktop computer, a laptop computer, a handheld computer, a NetBook, a Smartphone, and/or other computing platforms.

The user interface(s) 104 may be configured to provide an interface between the system 100 and a user through which the user may provide information to and receive information from the system 100. This enables data, results, and/or instructions and any other communicable items, collectively referred to as "information," to be communicated between the user and the system 100. As used herein, the term "user" may refer to a single individual or a group of individuals who may be working in coordination. According to some implementations, the user interface(s) 104 includes a plurality of separate interface devices. The user interface(s) 104 may be communicatively coupled to the computing platform 102. Such coupling may be hard-wired and/or wireless. In some implementations, the user interface(s) 104 is integrated with the computing platform 102 as a single device.

The user interface(s) 104 may include one or more user input devices and/or one or more system output devices. A given user input device may be configured to receive information from a user and generate signals related to that information, which may be provided to other components of the system 100. Examples of user input devices may include one or more of a game controller, a keypad, buttons, switches, a keyboard, knobs, levers, a touch screen, a microphone, and/or other user input devices. A given system output device may be configured to provide information to a user via visual information, audio information, tactile information, and/or other information. Examples of system output devices may include one or more of a display screen, a touch screen, speakers, an indicator light, an audible alarm, a printer, and/or system output devices. In some implementations, a given user interface may be a combined user input device and system output device (e.g., a touch screen).

Figure 2:
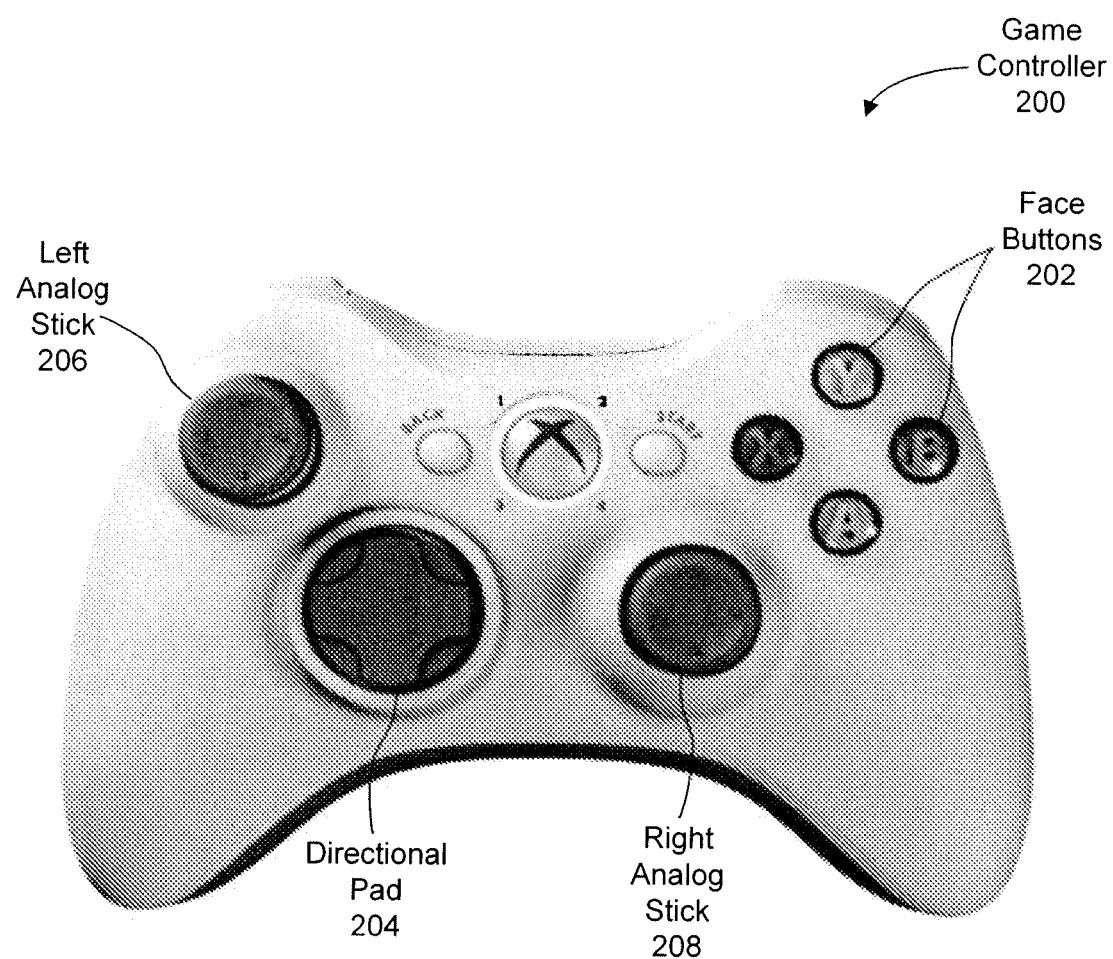
FIG. 2 illustrates an exemplary game controller, in accordance with one or more implementations.

FIG. 2 illustrates an exemplary game controller 200, in accordance with one or more implementations. The user interface(s) 104 may include the game controller 200. The game controller 200 is described herein for illustrative purposes and is not intended to be limiting. It is appreciated that, in one or more implementations, the user interface(s) 104 may include one or more game controllers and/or user input devices other than the game controller 200. The game controller 200 may be communicatively coupled by hard wire or wirelessly to the computing platform 102. The game controller 200 may be configured to receive information from a user by way of manipulation of one or more components of the game controller 200, generate signals related to that information, provide those signals to the computing platform 102, and/or other functions associated with the computing platform 102 and/or a virtual environment. The game controller 200 may allow a user to control an avatar (described in further detail herein) within a virtual environment, an object within a virtual environment, and/or other aspects of the virtual environment.

The game controller 200 may include one or more components that can be manipulated by a user to facilitate interaction with a virtual environment. Such components may include one or more buttons (e.g., face buttons 202), one or more triggers (not depicted in FIG. 2), one or more bumpers (not depicted in FIG. 2), one or more directional pads (may be referred to as a D-pad) (e.g., directional pad 204), one or more analog sticks (may be referred to as a thumb stick or control stick) (e.g., left analog stick 206 and/or right analog stick 208), and/or other components that can be manipulated by a user to facilitate interaction with a virtual environment.

One or more components of the game controller 200 may be assigned one or more specific functions particular to a given virtual environment. By way of non-limiting example, the face buttons 202 may each be assigned a different action of an avatar in a virtual environment such that when a user manipulates one of the game controller 200 the avatar will perform the corresponding action. The directional pad 204 may be configured to provide two-dimensional control (e.g., directional control of an avatar and/or virtual environment view angles) in the virtual environment. The left analog stick 206 and/or the right analog stick 208 configured to provide two-dimensional control (e.g., directional control of an avatar and/or virtual environment view angles) in the virtual environment. Generally speaking, an analog stick may include a stick protruding from the game controller 200. The analog stick may include a grip pad on the protruding end of the stick to facilitate manipulation of the analog stick by a user's thumb. Input may be based on the position of the analog stick in relation to a default "center" position.

Referring again to FIG. 1, the external resources 106 may include sources of information, hosts and/or providers of virtual environments outside of the system 100, external entities participating with the system 100, and/or other resources. In some implementations, some or all of the functionality attributed herein to the external resources 106 may be provided by resources included in the system 100.

Components of the system 100, the computing platform 102, the user interface(s) 104, and/or the external resources 106 may be operatively linked via one or more electronic communication links. For example, such electronic communication links may be established, at least in part, via a network 108, which may include the Internet and/or other networks. It will be appreciated that this is not intended to be limiting, and that the scope of this disclosure includes implementations in which the computing platform 102, the user interface(s) 104, and/or the external resources 106 are operatively linked via some other communication media.

As depicted in FIG. 1, the computing platform 102 may include electronic storage 110, one or more processors 112, and/or other components. The electronic storage 110 may comprise electronic storage media that electronically stores information. The electronic storage media of the electronic storage 110 may include one or both of system storage that is provided integrally (i.e., substantially non-removable) with the computing platform 102 and/or removable storage that is removably connectable to computing platform 102 via, for example, a port (e.g., a USB port, a firewire port, etc.) or a drive (e.g., a disk drive, etc.). The electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may store software algorithms, information determined by the processor(s) 112, information received from user interface(s) 104, information received from the external resources 106, and/or other information that enables the system 100 to function as described herein.

The processor(s) 112 may be configured to provide information processing capabilities in the computing platform 102. As such, the processor(s) 112 may include one or more of a digital processor, an analog processor, a digital circuit designed to process information, an analog circuit designed to process information, a state machine, and/or other mechanisms for electronically processing information. Although the processor(s) 112 is shown in FIG. 1 as a single entity, this is for illustrative purposes only. In some implementations, the processor(s) 112 may include a plurality of processing units. These processing units may be physically located within the same device, or the processor(s) 112 may represent processing functionality of a plurality of devices operating in coordination.

The processor(s) 112 may be configured to execute one or more computer program modules. The one or more computer program modules may include one or more of a virtual environment module 114, a content tracking module 116, a communications module 118, an analysis module 120, and/or other modules. The processor(s) 112 may be configured to execute modules 114, 116, 118, and/or 120 by software; hardware; firmware; some combination of software, hardware, and/or firmware; and/or other mechanisms for configuring processing capabilities on the processor(s) 112.

It should be appreciated that although modules 114, 116, 118, and 120 are illustrated in FIG. 1 as being co-located within a single processing unit, in implementations in which the processor(s) 112 includes multiple processing units, one or more of modules 114, 116, 118, and/or 120 may be located remotely from the other modules. The description of the functionality provided by the different modules 114, 116, 118, and/or 120 described below is for illustrative purposes, and is not intended to be limiting, as any of modules 114, 116, 118, and/or 120 may provide more or less functionality than is described. For example, one or more of modules 114, 116, 118, and/or 120 may be eliminated, and some or all of its functionality may be provided by other ones of modules 114, 116, 118, and/or 120. As another example, the processor(s) 112 may be configured to execute one or more additional modules that may perform some or all of the functionality attributed below to one of modules 114, 116, 118, and/or 120.

The virtual environment module 114 may be configured to provide content associated with a virtual environment for presentation to a user. The content may include views of the virtual environment. The content may be provided to one or more of the user interface(s) 104 for presentation to the user. The content may be provided, for example, at a normal presentation rate, an accelerated presentation rate, a slowed presentation rate, and/or other presentation rates. The accelerated presentation rate may be faster than the normal presentation rate, whereas the slowed presentation rate may be slower than the normal presentation rate. The content may be provided in a forward sequence or a reverse sequence. As used herein, a "virtual environment" may include a virtual space and/or other virtual environments.

A virtual space may include a simulated space (e.g., a physical space) instanced on a computing platform (e.g., the computing platform 102) which formats a view of the virtual space for display to a user. In some implementations, a virtual space may comprise a simulated space instanced on a server (e.g., the external resources 106) that is accessible by a client (e.g., the computing platform 102) located remotely from the server to format a view of the virtual space for display to a user. A virtual space may be associated with a video game. The simulated space may have a topography, express ongoing real-time interaction by the user, and/or include one or more objects positioned within the topography that are capable of locomotion within the topography. In some instances, the topography may be a 2-dimensional topography. In other instances, the topography may be a 3-dimensional topography. The topography may include dimensions of the virtual space, and/or surface features of a surface or objects that are "native" to the virtual space. In some instances, the topography may describe a surface (e.g., a ground surface) that runs through at least a substantial portion of the virtual space. In some instances, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.).

Within a virtual space provided by the computing platform 102, avatars associated with the users may be controlled by the users to interact with each other. As used herein, the term "avatar" may refer to an object (or group of objects) present in the virtual space that represents an individual user. The avatar may be controlled by the user with which it is associated. The avatars may interact with each other by physical interaction within the instanced virtual space, through text chat, through voice chat, and/or through other interactions. The avatar associated with a given user may be created and/or customized by the given user.

The content tracking module 116 may be configured to store or record content information related to the content provided to the user via the virtual environment module 114. The content information may include the actual content provided to the user, or the content information may be indicative of the content provided to the user. The content information may be indicative of the sequence in which the content was provided to the user. The content information may be stored or recorded in the electronic storage 110 and/or other electronic storage media. In some implementations, the virtual environment module 114 may be configured to provide content for presentation to the user in the reverse sequence based on stored or recorded content information.

The communications module 118 may be configured to facilitate transfer of signals and/or information between the computing platform 102 and user interface(s) 104. For example, the communications module 118 may be configured to receive one or more signals from a user input device (e.g., the user interface(s) 104 and/or the game controller 200) responsive to a manipulation of the user input device by the user. The signal(s) may include manipulation information related to the manipulation of the user input device by the user. The manipulation information may include, for example, an indication of a component of the user input device (e.g., the face buttons 202, the directional pad 204, the left analog stick 206, and/or the right analog stick 208) that was manipulated by the user, a degree of manipulation (e.g., the left analog stick 206 being shifted half of the entire range of motion from the default center position), a direction of manipulation (e.g., the left analog stick 206 being shifted to the left of the default center position), and/or other information related to the manipulation of the user input device by the user.

The analysis module 120 may be configured to determine whether a first manipulation of a user input device (e.g., the user interface(s) 104 and/or the game controller 200) satisfies a first condition based on manipulation information included in the signal(s) received by the communications module 118. Specific examples of conditions such as the first condition are described further herein. The virtual environment module 114 may be configured to provide the content for presentation to the user in a reverse sequence starting with the most recently provided content responsive to a determination that the first manipulation of the user input device satisfies the first condition.

The analysis module 120 may be configured to determine whether the first manipulation of the user input device breaches a first threshold based on the manipulation information included in the signal(s) received by the communications module 118. This determination may be performed responsive to the determination that the manipulation of the user input device satisfies the first condition. Specific examples of thresholds such as the first threshold are described further herein. The virtual environment module 114 may be configured to provide the content for presentation to the user in the reverse sequence starting with the most recently provided content at a presentation rate that is different that the normal presentation rate responsive to a determination that the first manipulation of the user input device breaches the first threshold.

The analysis module 120 may be configured to determine whether a second manipulation of the user input device satisfies a second condition based on the second manipulation information included in the signal(s) received by the communications module 118. Specific examples of conditions such as the second condition are described further herein. The virtual environment module 114 may be configured to provide the content for presentation to the user in the forward sequence starting with the most recently provided content responsive to a determination that the second manipulation of the user input device satisfies the second condition. In some implementations, the content provided for presentation to the user in the forward sequence starting with the most recently provided content responsive to the determination that the second manipulation of the user input device satisfies the second condition may be limited to content the has been previously provided to the user.

The analysis module 120 may be configured to determine whether the second manipulation of the user input device breaches a second threshold based on the second manipulation information included in the signal(s) received by the communications module 118. This determination may be performed responsive to the determination that the second manipulation of the user input device satisfies the second condition. Specific examples of thresholds such as the second threshold are described further herein. The virtual environment module 114 may be configured to provide the content for presentation to the user in the forward sequence starting with the most recently provided content at a presentation rate that is different that the normal presentation rate responsive to a determination that the second manipulation of the user input device breaches the second threshold.

In implementations where the user input device includes an analog stick (see, e.g., the game controller 200 depicted in FIG. 2), the analysis module 120 may determine one or more aspects of a manipulation of the analog stick. Examples of such aspects may include current angle, angular change, angular velocity, time dilation, and/or other aspects of a manipulation of the analog stick. According to one or more implementations, these aspects may be determined by:

$$\text{CurrentAngle} = \text{ArcTan}(\text{stickPosition}Y, \text{stickPosition}X); \quad \text{(EQN. 1)}$$

$$\text{AnglularChange} = \text{LastAngle} - \text{Current Angle}; \quad \text{(EQN. 2)}$$

$$\text{AngularVelocity} = \text{AngularChange}/\text{DeltaTime}; \text{ and} \quad \text{(EQN. 3)}$$

$$\text{TimeDilation} = \text{AngularVelocity}/\text{Threshold}; \quad \text{(EQN. 4)}$$

where stickPositionY and stickPositionX describe the position of the analog stick relative to the default center position, DeltaTime is the duration over which an angular change occurs, and TimeDilation is the time dilation of the manipulation, which is a ratio between the angular velocity of the analog stick and a threshold value. As described further herein, the time dilation may affect whether the presentation rate of content is accelerated or slowed relative to the normal presentation rate.

In implementations where the user input device includes an analog stick, conditions such as the first condition and the second condition may relate to the nature of a manipulation of the analog stick. For example, a condition may include that the analog stick may manipulated in a circular movement. Such a condition may further include that the circular movement be in a clockwise or counterclockwise direction. Thresholds such as the first threshold and the second threshold may relate to an angular velocity or rotation rate of the analog stick. Such a threshold may be referred to as a rotation rate threshold. The virtual environment module 114 may be configured to provide the content for presentation to the user at a presentation rate that is different from the normal presentation rate responsive to a determination that the rotation rate of the circular movement of the analog stick breaches the rotation rate threshold.

Figure 3:
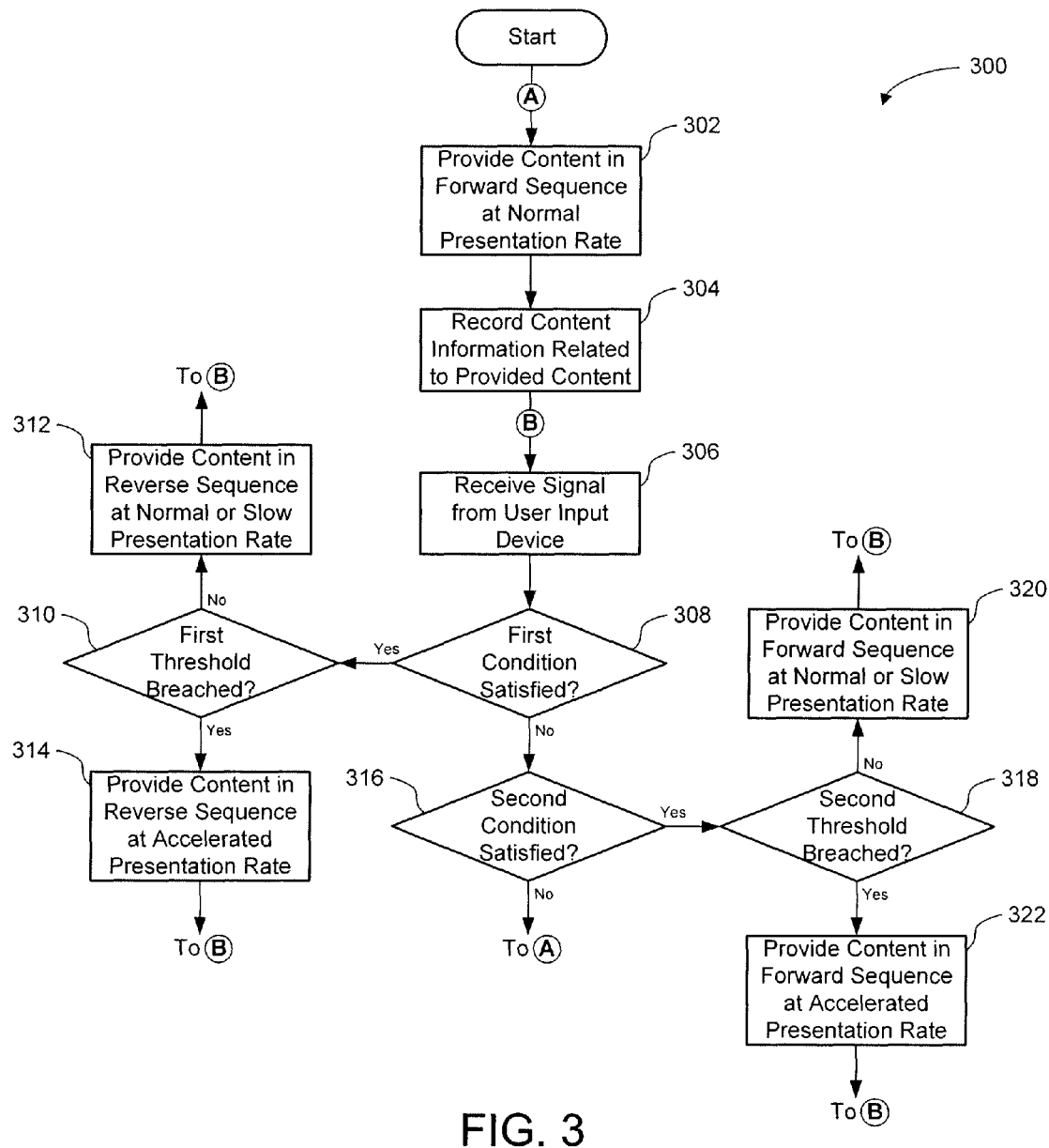
FIG. 3 is a flowchart illustrating a method for temporal control of a virtual environment, in accordance with one or more implementations.

FIG. 3 is a flowchart illustrating a method 300 for temporal control of a virtual environment, in accordance with one or more implementations. The operations of the method 300 presented below are intended to be illustrative. In some implementations, the method 300 may be accomplished with one or more additional operations not described, and/or without one or more of the operations discussed. Additionally, the order in which the operations of the method 300 are illustrated in FIG. 3 and described below is not intended to be limiting.

In some implementations, the method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the method 300 in response to instructions stored electronically on an electronic storage medium. The one or more processing devices may include one or more devices configured through hardware, firmware, and/or software to be specifically designed for execution of one or more of the operations of the method 300.

At operation 302, content may be provided for presentation to a user. The content may include views of a virtual environment. The content may be provided at the normal presentation rate and in the forward sequence. The content may be presented via one or more user interface(s) 104. The virtual environment module 114 may be executed to perform operation 302, according to some implementations.

At operation 304, content information related to the content provided to the user may be recorded. The content information may be indicative of the content provided to the user and/or the sequence in which the content was provided to the user. The content tracking module 116 may be executed to perform operation 304, in some implementations.

At operation 306, a signal from a user input device may be received responsive to a manipulation of the user input device by the user. The signal may include manipulation information related to the manipulation of the user input device by the user. The user input device may include the user interface(s) 104, the game controller 200, and/or other user input devices. In accordance with some implementations, the communications module 118 may be executed to perform operation 306.

At operation 308, a determination may be made as to whether the manipulation of the user input device satisfies a first condition based on the manipulation information. Operation 308 may include determining one or more aspects of the manipulation. In implementations where the user input device includes an analog stick, the first condition may be the manipulation of the user input device being a counterclockwise circular rotation of the analog stick. Operation 308 may be performed through execution of the analysis module 120, in some implementations. The method 300 may proceed to operation 310 responsive to an affirmative determination at operation 308. The method 300 may proceed to operation 316 responsive to an negative determination at operation 308.

At operation 310, a determination may be made as to whether the manipulation of the user input device breaches a first threshold based on the manipulation information. Operation 310 may include determining one or more aspects of the manipulation. In implementations where the user input device includes an analog stick, the first threshold may be the manipulation of the user input device being a counterclockwise circular rotation of the analog stick with a rotation rate that breaches a rotation rate threshold. Operation 310 may be performed through execution of the analysis module 120, in some implementations. The method 300 may proceed to operation 312 responsive to an negative determination at operation 310. The method 300 may proceed to operation 314 responsive to an affirmative determination at operation 310.

At operation 312, the content may be provided for presentation to the user in a reverse sequence starting with the most recently provided content. The content may be provided at the normal presentation rate or the slowed presentation rate, according to various implementations. In some implementation, the content provided for presentation to the user at operation 312 may be based on the content information recorded at operation 304. The virtual environment module 114 may be executed to perform operation 312 in some implementations. The method 300 may proceed to process flow point B between operations 304 and 306.

At operation 314, the content may be provided for presentation to the user in a reverse sequence starting with the most recently provided content. The content may be provided at the accelerated presentation rate, according to various implementations. In some implementation, the content provided for presentation to the user at operation 314 may be based on the content information recorded at operation 304. The virtual environment module 114 may be executed to perform operation 312 in some implementations. The method 300 may proceed to process flow point B between operations 304 and 306.

At operation 316, a determination may be made as to whether the manipulation of the user input device satisfies a second condition based on the manipulation information. Operation 316 may include determining one or more aspects of the manipulation. In implementations where the user input device includes an analog stick, the second condition may be the manipulation of the user input device being a clockwise circular rotation of the analog stick. Operation 316 may be performed through execution of the analysis module 120, in some implementations. The method 300 may proceed to process flow point A, which precedes operation 302, responsive to an negative determination at operation 316. The method 300 may proceed to operation 318 responsive to an affirmative determination at operation 316.

At operation 318, a determination may be made as to whether the manipulation of the user input device breaches a second threshold based on the manipulation information. Operation 318 may include determining one or more aspects of the manipulation. In implementations where the user input device includes an analog stick, the second threshold may be the manipulation of the user input device being a clockwise circular rotation of the analog stick with a rotation rate that breaches a rotation rate threshold. Operation 318 may be performed through execution of the analysis module 120, in some implementations. The method 300 may proceed to operation 320 responsive to an negative determination at operation 318. The method 300 may proceed to operation 322 responsive to an affirmative determination at operation 318.

At operation 320, the content may be provided for presentation to the user in the forward sequence starting with the most recently provided content. The content may be provided at the normal presentation rate or the slowed presentation rate, according to various implementations. In some implementation, the content provided for presentation to the user at operation 320 may be based on the content information recorded at operation 304. The virtual environment module 114 may be executed to perform operation 320 in some implementations. The method 300 may proceed to process flow point B between operations 304 and 306.

At operation 322, the content may be provided for presentation to the user in the forward sequence starting with the most recently provided content. The content may be provided at the accelerated presentation rate, according to various implementations. In some implementation, the content provided for presentation to the user at operation 322 may be based on the content information recorded at operation 304. The virtual environment module 114 may be executed to perform operation 322 in some implementations. The method 300 may proceed to process flow point B between operations 304 and 306.

Although the present technology has been described in detail for the purpose of illustration based on what is currently considered to be the most practical and preferred implementations, it is to be understood that such detail is solely for that purpose and that the present technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:
1. A method for intuitive real-time temporal control of a videogame during gameplay such that progress in the videogame is rewound to an earlier point in the gameplay, the method comprising:
providing content associated with an instance of the videogame for presentation to a user, the content being provided during gameplay at a first presentation rate and in a forward sequence, the content comprising views of a virtual environment of the videogame;

receiving a first signal during gameplay from a user input device comprising an analog stick responsive to a first manipulation of the analog stick by the user, the first signal conveying first manipulation information related to the first manipulation of the analog stick by the user;

determining whether the first manipulation of the analog stick satisfies a first condition based on the first manipulation information, the first condition including the first manipulation of the analog stick being a circular movement in a counterclockwise direction; and providing the content for presentation to the user during gameplay in a reverse sequence starting with the most recently provided content responsive to a determination that the first manipulation of the analog stick satisfies the first condition.

2. The method of claim 1, further comprising:

recording content information related to the content provided to the user, the content information being indicative of the content provided to the user and the sequence in which the content was provided to the user; and wherein providing the content for presentation to the user in the reverse sequence is based on the recorded content information.

3. The method of claim 1, further comprising:

receiving a second signal from the user input device responsive to a second manipulation of the analog stick by the user, the second signal including second manipulation information related to the second manipulation of the analog stick by the user;

determining whether the second manipulation of the analog stick satisfies a second condition based on the second manipulation information, the second condition including the second manipulation of the analog stick being a circular movement in a clockwise direction; and providing the content for presentation to the user in the forward sequence starting with the most recently provided content responsive to a determination that the second manipulation of the analog stick satisfies the second condition.

4. The method of claim 3, wherein the content provided for presentation to the user in the forward sequence starting with the most recently provided content responsive to the determination that the second manipulation of the analog stick satisfies the second condition is limited to content the has been previously provided to the user.

5. The method of claim 3, further comprising:

determining whether the second manipulation of the analog stick breaches a second threshold based on the second manipulation information responsive to the determination that the second manipulation of the analog stick satisfies the second condition; and wherein the content provided for presentation to the user in the forward sequence starting with the most recently provided content is provided at a second presentation rate responsive to a determination that the second manipulation of the analog stick breaches the second threshold, the second presentation rate being different than the first presentation rate.

6. The method of claim 1, further comprising:

determining whether the first manipulation of the analog stick breaches a first threshold based on the first manipulation information responsive to the determination that the first manipulation of the analog stick satisfies the first condition; and wherein the content provided for presentation to the user in the reverse sequence starting with the most recently provided content is provided at a second presentation rate responsive to a determination that the first manipulation of the analog stick breaches the first threshold, the second presentation rate being different than the first presentation rate.

7. The method of claim 1, further comprising determining whether a rotation rate of the counterclockwise circular movement of the analog stick breaches a rotation rate threshold; and wherein the content provided for presentation to the user in the reverse sequence starting with the most recently provided content responsive to the determination that the first manipulation of the analog stick satisfies the first condition is provided at a second presentation rate, the second presentation rate being different than the first presentation rate.

8. The method of claim 1, wherein the virtual environment includes an avatar controlled by the user, and wherein the content includes views of the avatar.

9. A system configured to provide intuitive real-time temporal control of a videogame during gameplay such that progress in the videogame is rewound to an earlier point in the gameplay, the system comprising:

one or more processors configured by computer-readable instructions to:

provide content associated with an instance of the videogame for presentation to a user, the content being provided during gameplay at a first presentation rate and in a forward sequence, the content comprising views of a virtual environment of the videogame;

receive a first signal during gameplay from a user input device comprising an analog stick responsive to a first manipulation of the analog stick by the user, the first signal conveying first manipulation information related to the first manipulation of the analog stick by the user;

determine whether the first manipulation of the analog stick satisfies a first condition based on the first manipulation information, the first condition including the first manipulation of the analog stick being a circular movement in a counterclockwise direction; and provide the content for presentation to the user during gameplay in a reverse sequence starting with the most recently provided content responsive to a determination that the first manipulation of the user analog stick satisfies the first condition.

10. The system of claim 9, wherein the one or more processors are further configured by computer-readable instructions to record content information related to the content provided to the user, the content information being indicative of the content provided to the user and the sequence in which the content was provided to the user;

wherein providing the content for presentation to the user in the reverse sequence based on the recorded content information.

11. The system of claim 9, wherein the one or more processors are further configured by computer-readable instructions to:

receive a second signal from the user input device responsive to a second manipulation of the analog stick by the user, the second signal including second manipulation information related to the second manipulation of the analog stick by the user;

determine whether the second manipulation of the analog stick satisfies a second condition based on the second manipulation information, the second condition including the second manipulation of the analog stick being a circular movement in a clockwise direction; and provide the content for presentation to the user in the forward sequence starting with the most recently provided content responsive to a determination that the second manipulation of the analog stick satisfies the second condition.

12. The system of claim 11, wherein the content provided for presentation to the user in the forward sequence starting with the most recently provided content responsive to the determination that the second manipulation of the analog stick satisfies the second condition is limited to content the has been previously provided to the user.

13. The system of claim 11, wherein the one or more processors are further configured by computer-readable instructions to:

determine whether the second manipulation of the analog stick breaches a second threshold based on the second manipulation information responsive to the determination that the second manipulation of the analog stick satisfies the second condition; and provide the content for presentation to the user in the forward sequence starting with the most recently provided content at a second presentation rate responsive to a determination that the second manipulation of the analog stick breaches the second threshold, the second presentation rate being different than the first presentation rate.

14. The system of claim 9, wherein the one or more processors are further configured by computer-readable instructions to:

determine whether the first manipulation of the analog stick breaches a first threshold based on the first manipulation information responsive to the determination that the first manipulation of the analog stick satisfies the first condition; and provide the content for presentation to the user in the reverse sequence starting with the most recently provided content at a second presentation rate responsive to a determination that the first manipulation of the analog stick breaches the first threshold, the second presentation rate being different than the first presentation rate.

15. The system of claim 9, wherein the one or more processors are further configured by computer-readable instructions to:

determine whether a rotation rate of the counterclockwise circular movement of the analog stick breaches a rotation rate threshold; and provide the content for presentation to the user in the reverse sequence starting with the most recently provided content at a second presentation rate responsive to a determination that the rotation rate of the counterclockwise circular movement of the analog stick breaches the rotation rate threshold, the second presentation rate being different than the first presentation rate.

16. The system of claim 9, wherein the virtual environment includes an avatar controlled by the user, and wherein the content includes views of the avatar.

* * * * *